United States Patent [19]

Fukasaku et al.

[11] Patent Number: 5,199,846
[45] Date of Patent: Apr. 6, 1993

[54] CENTRIFUGAL FAN WITH NOISE SUPPRESSING ARRANGEMENT

[75] Inventors: Yoshinori Fukasaku, Hitachi; Mitsuaki Mirumachi, Mito; Katsuhiko Hashimoto; Susumu Yamazaki, both of Tsuchiura, all of Japan

[73] Assignees: Hitachi, Ltd., Tokyo; Hitachi Automotive Engineering Co., Ltd., Ibaraki, both of Japan

[21] Appl. No.: 780,240

[22] Filed: Oct. 22, 1991

[30] Foreign Application Priority Data

Oct. 22, 1990 [JP] Japan .................. 2-282006
Nov. 30, 1990 [JP] Japan .................. 2-329155

[51] Int. Cl.⁵ .......................................... F01D 25/04
[52] U.S. Cl. ................................. 415/119; 415/206; 181/224; 181/292; 181/294; 417/312; 424/76.2
[58] Field of Search ............ 415/119, 128, 197, 203, 415/206; 181/224, 292, 294; 417/312; 424/76.2

[56] References Cited

U.S. PATENT DOCUMENTS

| 2,498,143 | 2/1950 | Struckmann | 415/197 |
| 3,156,233 | 11/1964 | O'Connell | 415/119 |
| 3,312,389 | 4/1967 | Matsui | 415/119 |
| 4,560,395 | 12/1985 | Davis | 415/119 |
| 4,808,202 | 2/1989 | Nishikawa et al. | 181/175 |
| 4,938,309 | 7/1990 | Emdy | 417/312 |
| 5,041,324 | 8/1991 | Siegling et al. | 415/119 |

FOREIGN PATENT DOCUMENTS 0063305 8/1973 Japan .
0024566 5/1982 Japan .
0090415 4/1988 Japan .

*Primary Examiner*—Edward K. Look
*Assistant Examiner*—Christopher Verdier
*Attorney, Agent, or Firm*—Antonelli, Terry, Stout & Kraus

[57] ABSTRACT

A centrifugal fan with a noise suppressing arrangement includes a fan, a motor for rotating the fan and a scroll casing for accommodating the fan, the scroll casing is formed of a first scroll casing member covering the fan and a second scroll casing member forming the bottom part of the scroll casing, the second scroll casing member being provided with at the center thereof a cylindrical housing for holding the electric motor, and further includes a porous sound absorbing member having elasticity sandwiched and secured between the first scroll casing member and the second scroll casing member whereby the combination of the porous sound absorbing member and an air layer formed between the porous sound absorbing member and the inner bottom wall of the second scroll casing member suppresses noises caused by rotation of the fan.

5 Claims, 5 Drawing Sheets

CENTRIFUGAL FAN WITH NOISE SUPPRESSING ARRANGEMENT

BACKGROUND OF THE INVENTION

The present invention relates to a centrifugal fan which includes vanes, for example, forward curved vanes, radial curved vanes or backward curved vanes and, in particular, relates to a centrifugal fan with a noise suppressing arrangement suitable for house-hold use and for cooling business machines, computers and, particularly, air conditioners in motor vehicles.

A conventional centrifugal fan, such as disclosed in Japanese Utility Model Laid-Open No. 48-63305 (1973), is constructed by a fan, a scroll casing accommodating the fan and a motor for driving the fan. In such a construction, the fan suctions air from the axial direction and discharges the air in the radial direction of the fan. Namely, the centrifugal fan is constructed to discharge the air in a centrifugal direction. This scroll casing gradually restores the dynamic pressure caused by rotating the fan to a static pressure within the scroll casing.

However, in such structure, no counter-measure is taken for reducing an air pulsating sound caused by the fan, a vortex sound caused by wind separation from the vanes and a turbulent sound within the scroll casing.

Japanese Utility Model Publication No. 57-24566 (1982) discloses an air conditioner for use in an automobile wherein an inner and outer air changeover box is modified so as to indirectly reduce such noises.

Patent Application Laid-Open No. 63-90415 (1988) discloses an air conditioner for use in an automobile, wherein a sound absorbing member which is formed by adhering a thin elastic nonporous member on a surface of a thick elastic porous member is attached to the bottom wall of the scroll casing of the centrifugal fan for reducing noise.

In the conventional centrifugal fan disclosed above, Japanese Utility Model Laid-Open No. 48-63305 (1973), the air pulsating sound caused by the fan, the vortex sound caused by wind separation from vanes and the turbulent sound within the scroll casing are not specifically suppressed, resulting in a total noise level from the centrifugal fan which is comparatively high.

With regard to the air conditioner for use in an automobile as disclosed in Japanese Utility Model Publication No. 57-24566 (1982), the modification of the inner and outer air changeover box results in a complex structure, and the production cost increases; and the mounting condition thereof lowers the versatility.

Further, in the scroll casing of the centrifugal fan disclosed in Japanese Patent Application Laid-Open No. 63-90415 (1988), the sound absorbing member adheres to the bottom of the scroll casing to reduce the noise. However, a soft polyurethane foam which is generally used as a sound absorbing material particularly absorbs sounds having high frequency components of more than 1000 Hz and generally does not absorb sound having low frequency components, for example, less than 1000 Hz. In the Japanese Patent Application Laid-Open No. 63-90415 (1988), the elimination of the above problems of the sound absorbing member is disclosed by adhering a thin plate of an elastic nonporous material such as chloroprene rubber plate on one of the surfaces of a thick plate of an elastic porous material such as soft polyurethane foam. With the use of such sound absorbing member, the vibrating energy of the sound waves covering a broad range of the frequency components can be absorbed by the two kinds of sound absorbing materials adhered having different sound absorbing characteristics. With such a sound absorbing member, it is possible to absorb the vibrating energy of low frequency sound waves because of the use of the elastic non-porous material on the surface of the combined sound absorbing member; however, the unabsorbed sound waves can not reach the lower elastic porous material; quite the contrary, the unabsorbed sound waves are reflected at the interface such that the substantial benefit of the elastic porous material disposed in the lower side is lost compared with the effect obtainable by a mere provision of the thick elastic porous material. Therefore, the sound waves of the high frequency components can not be reduced.

Further, for maximizing the effect of the sound absorbing member, it is necessary to provide the sound absorbing member over the entire inner wall surface of the scroll casing such that the thin plate is difficult to adhere to curved surfaces which increases the production cost; further there is a problem that the sound absorbing member such as the thin plate, which is always subject to the wind flow, may peel off if no countermeasure are taken.

SUMMARY OF THE INVENTION

An object of the present invention is to provide a centrifugal fan with a noise suppressing apparatus which suppresses noise over a broad frequency band; the noises are caused by the rotation of the fan, and the noise suppressing apparatus has a simple structure, a high reliability, a high versatility and a low production cost.

For achieving the above object, according to one aspect of the present invention, a sound absorbing member is included in the scroll casing so as to construct an air layer between the sound absorbing member and the inner wall of the scroll casing whereby the combination of the sound absorbing member and the air layer constitutes an arrangement for the suppression of noise generated in the scroll casing due to rotation of the fan.

According to another aspect of the present invention, the scroll casing is divided into a first scroll casing member which covers the fan and a second scroll casing member which is located in the bottom portion of the scroll casing and is provided with a cylindrical housing at the center of the second scroll casing member for holding the electric motor; the sound absorbing member is sandwiched and secured between the first and second scroll casing members, and further, an air layer is formed between the sound absorbing member and the inner bottom wall of the second scroll casing member whereby the combination of the sound absorbing member and the air layer constitutes an arrangement for suppressing noise generated in the scroll casing due to rotation of the fan.

In the present invention, sound waves of many kinds, for example, air pulsating sound, vortex sound and further, turbulent wind sound are generated in the scroll casing, and first enter into the sound absorbing porous members and in the sound absorbing porous member; the sound waves of the intermediate and high frequency band components of the entire frequency band components are reduced. Further, the sound waves which pass through the sound absorbing porous member and which enter into the air layer and reach the inner wall of the scroll casing are reflected there and interfere with each other within the air layer to thereby attenuate the unabsorbed sound waves of low frequency band components.

According to the present invention, noise of a broad band frequency components generated in the scroll casing is effectively suppressed.

Further, noise generated by the electric motor for driving the fan is also effectively reduced.

Still further, the sound absorbing member which is sandwiched and secured between the first and second scroll casing members is easily detached therefrom if required; therefore, the sound absorbing property of the noise suppressing arrangement can be easily adjusted.

BRIEF DESCRIPTION OF THE PREFERRED EMBODIMENTS

Figure 1:
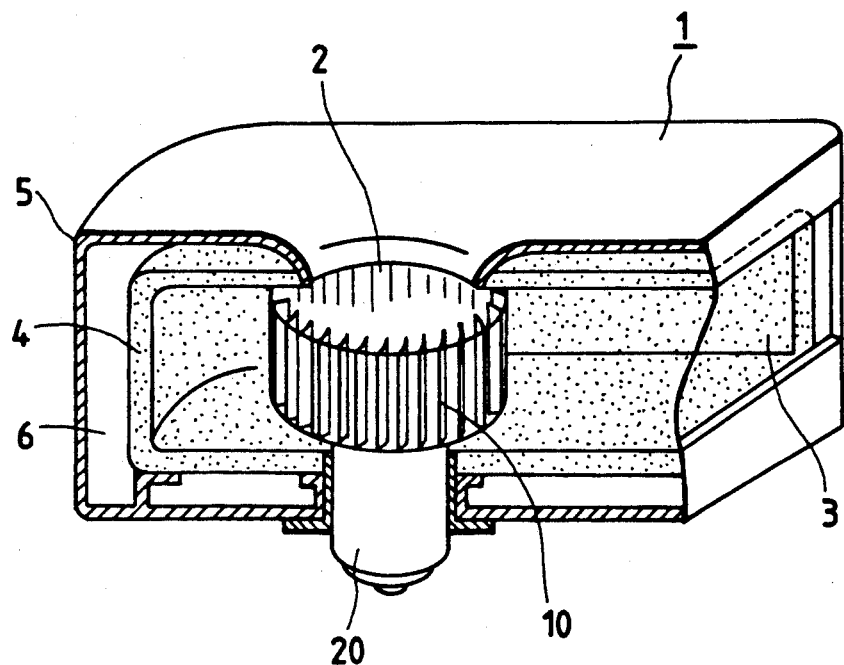
FIG. 1 is a cross sectional perspective view of a centrifugal fan showing one embodiment according to the present invention.
Figure 2:
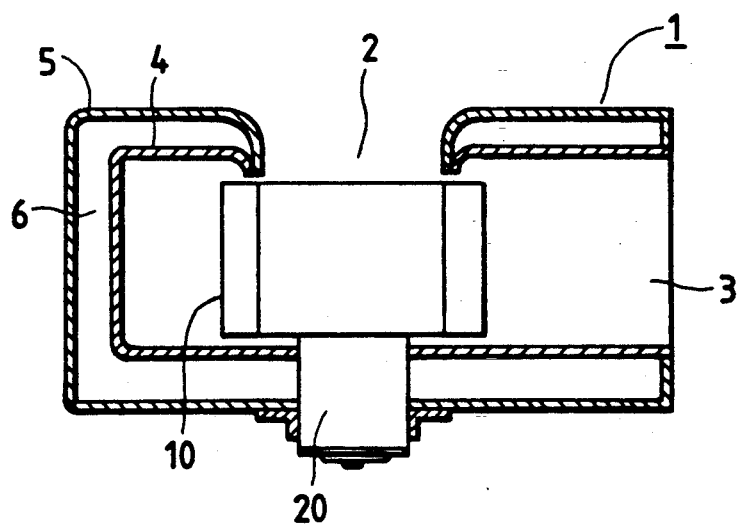
FIG. 2 is a vertical cross section of the centrifugal fan shown in FIG. 1.

Hereinbelow, an embodiment of the present invention is explained that is illustrated in FIG. 1 through FIG. 2.

FIG. 1 illustrates a cross sectional perspective view of a centrifugal fan, and FIG. 2 illustrates a vertical cross section thereof. A centrifugal fan 1 is constructed to include a scroll casing 5, a fan 10 accommodated within the scroll casing 5, and a motor for rotating the fan 10. Air is suctioned through a suction port 2 provided at the scroll casing 5 and is blown out in a radial direction with respect to the fan 10, and the air is discharged from a discharge port 3 provided at the scroll casing 5. The scroll casing 5 converts the dynamic pressure induced by rotation of the fan 10 into a static pressure. In the present embodiment, the centrifugal fan 1 constructed as such incorporates a noise suppressing apparatus in the scroll casing 5 by combining an elastic porous member having a sound absorbing property and an air layer.

Namely, a scroll casing member 4 located at the same position as a conventional scroll casing is constructed in the scroll casing 5; in other words, the scroll casing 5 is disposed around the outer circumference of the scroll casing member 4, and an air layer 6 is located between the scroll casing member 4 and the scroll casing 5 to form a double structure. The scroll casing member 4 is made of an elastic porous material; the scroll casing 5 disposed around the circumference thereof is made of a resin material, and the air layer 6 is located between the scroll casing member 4 and the scroll casing 5. The elastic porous material forming the scroll casing member 4 is made of materials that include air gaps in aggregates such as fibers, fine particles, and air bubbles in foamed bodies; the air gaps and air bubbles are connected with each other. Incident sound waves onto the surfaces of these materials propagate inside the materials via air in the gaps and the bubbles, and the incident sound waves loose their energy primarily by the viscosity and thermal conduction of the materials. Generally, when the thickness of the elastic porous material is increased, the sound absorbing ability thereof is increased. However, the cost is increased by increasing the thickness, and the formation of a thick elastic material is difficult. Further, the major sound wave absorbing band of these elastic porous materials is the intermediate and high frequency band components, and the sound wave absorbing effect of the low frequency band components is relative low.

Therefore, in the present embodiment that has the air layer 6 at the back face of the sound absorbing material, noises over the entire frequency band components can be reduced. The function of the noise suppressing apparatus is explained. Many kinds of sounds such as air pulsating sound, vortex sound due to wind separation from vanes and turbulent sound caused by air turbulence which is caused by rotation of the fan are mixed within the scroll casing member 4, and the sound waves pass through the scroll casing member 4 formed of an elastic porous material, while the sound waves pass through the scroll casing member 4, noises of intermediate and high frequency band components are reduced by the action explained above. The sound waves of intermediate and high frequency band components which have been reduced thereafter enter into a chamber of the air layer 6. The sound waves which have entered into the air layer 6 are reflected at the inner wall of the scroll casing 5 which is formed of a rigid material, and the sound waves of low frequency band component which have not been attenuated in the scroll casing member 4 by the sound absorbing material are attenuated because of mutual interference of the sound waves which have passed through the sound absorbing elastic porous material.

As explained above, by using the scroll casing in which a combination of the elastic porous material and the air layer is incorporated, noise reduction over the entire frequency band components is realized.

Further, when the scroll casing member 4 is made of an elastic porous material, the air blown out from the fan directly hits the side wall of the scroll casing member 4; the air may leak from the scroll casing member 4 into the air layer 6. In order to avoid this air leakage, a sound absorbing material formed by adhering an elastic non-porous material on the surface of an elastic porous material may be disposed at the side wall of the scroll casing member 4.

Figure 3:
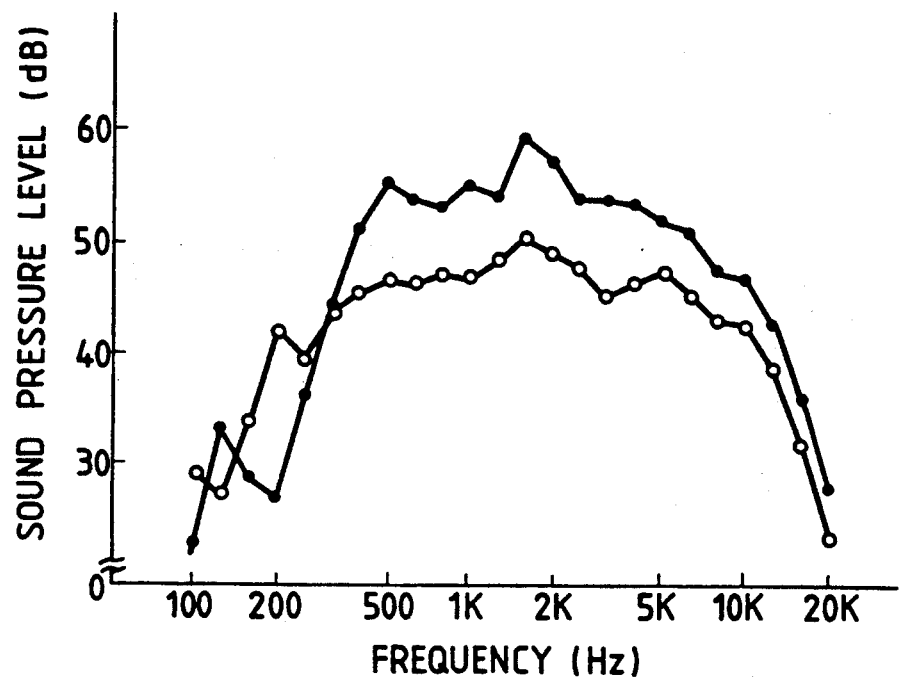
FIG. 3 is a graph showing a noise analysis result of the present invention in comparison with a conventional centrifugal fan.
Figure 4:
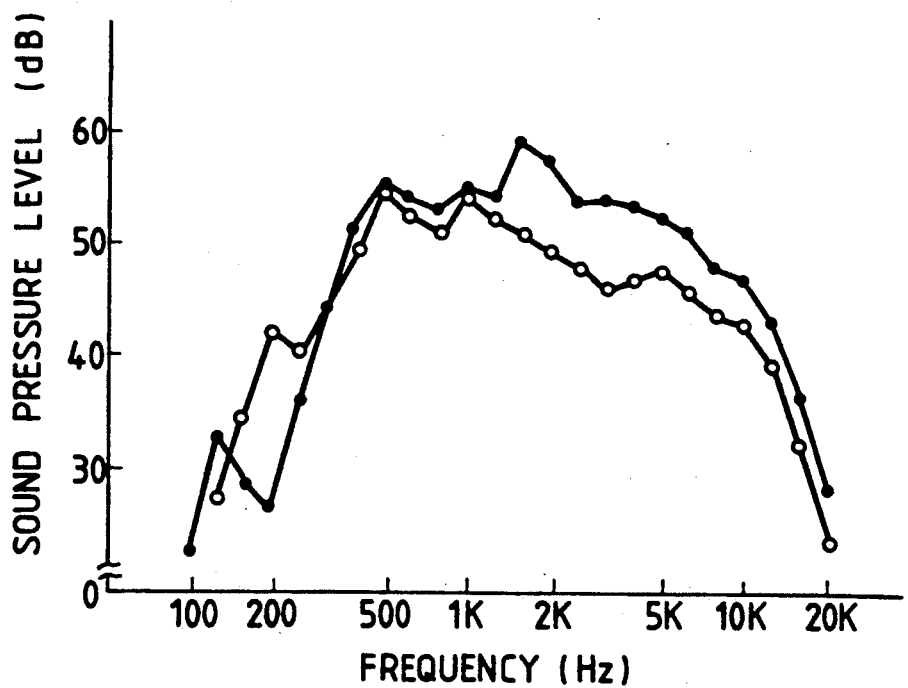
FIG. 4 is a graph showing a noise analysis result of two conventional centrifugal fans

FIG. 3 illustrates a result of noise measurement employing the above explained centrifugal fan with the noise suppressing arrangement. The noise measurement position was selected at a point approximately 1 m from the suction port. In FIG. 3, a curve formed by connecting solid circles illustrates a noise frequency analysis, resulting from the operation of a centrifugal fan having a conventional scroll casing, and a curve formed by connecting hollow circles illustrates a noise frequency analysis resulting from the operation of the centrifugal fan according to the present embodiment of the present invention. The graph illustrates that noises of a broad range from 200 Hz to 10 kHz are reduced with the centrifugal fan of the present embodiment. FIG. 4 illustrates a result of noise frequency analysis on two conventional centrifugal fans. In FIG. 4, a curve formed by connecting solid circles shows a noise frequency analysis resulting from the operation of the same conventional centrifugal fan as in FIG. 3, and a curve formed by connecting hollow circles illustrates a noise frequency analysis resulting from the operation of a conventional centrifugal fan with a scroll casing having the wall which an elastic porous material is provided with no air layer. In the case where only the elastic porous material is provided, noises having frequency band components less than 1 kHz are reduced by a small amount, and noises having frequency band components more than 1 kHz, namely, 1 kHz-10 kHz, are effectively reduced. It is understood from these two experimental results that when an elastic porous material is provided on the inner wall of the scroll casing, noises of the intermediate and high frequency band components are reduced and when an air layer is further provided, noises of low frequency band components can also be reduced.

Now, another embodiment of the present invention is illustrated with reference to FIG. 5 and FIG. 6.

In the embodiment illustrated in FIG. 1 and FIG. 2, the elastic porous member is disposed to face the entire inner wall portion of the scroll casing, namely, the wall adjacent to the suction port, the wall opposing the suction port, and the entire side wall, and between the respective walls and the elastic porous member; an air layer is formed such that the scroll casing is constructed to cover all of the elastic porous member. However, in the present embodiment, a partition plate 30 is disposed at the side opposing to the suction port; an air layer 6 is located between the partition plate 30 and the bottom inner wall of the scroll casing 5, and this partition plate 30 is made of an elastic porous material. With the present embodiment, noise is reduced over the entire frequency band similar to the reduction obtained with the above first embodiment.

Figure 5:
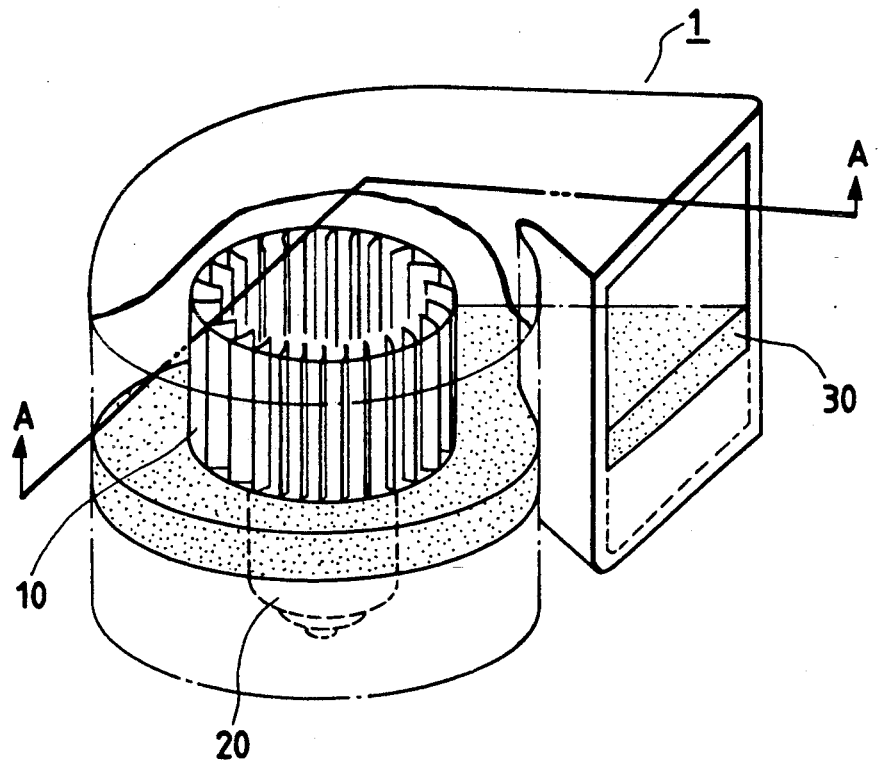
FIG. 5 is a perspective view showing another embodiment of the present invention.
Figure 6:
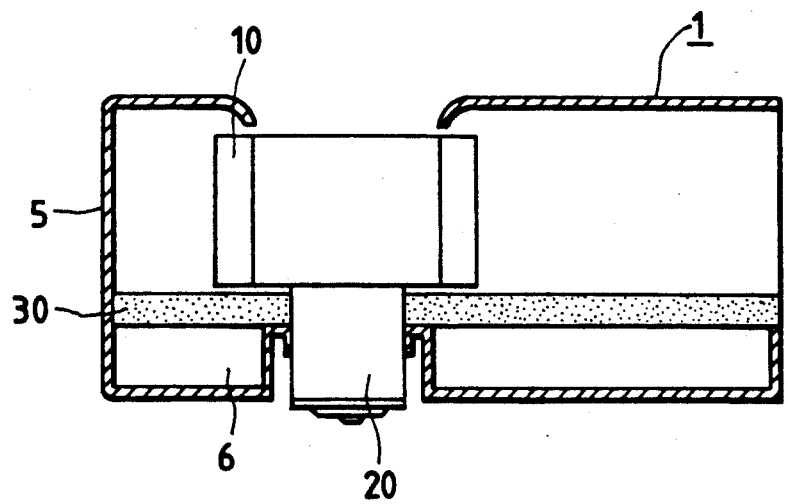
FIG. 6 is a cross section taken along the arrowed line A—A in FIG. 5.
Figure 7:
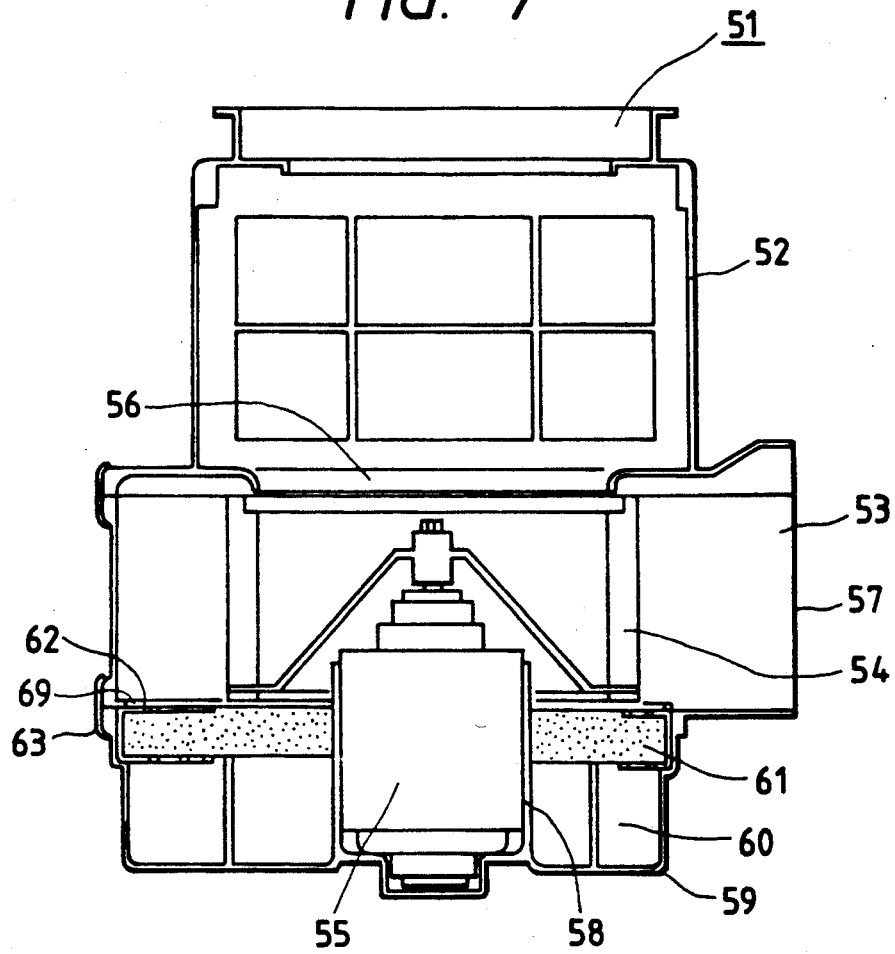
FIG. 7 is a cross sectional view of a further embodiment relating to that shown in FIG. 5.
Figure 8:
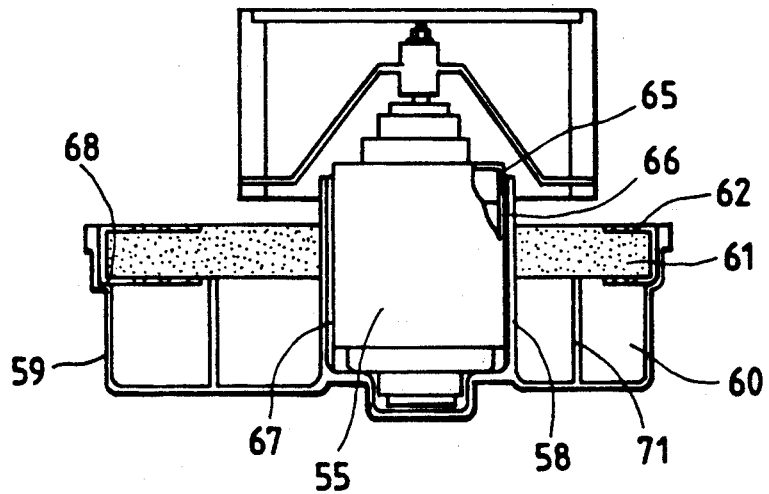
FIG. 8 is a cross sectional view in the course of assembly of the embodiment shown in FIG. 7, and FIG. 9 through FIG. 11 are vertical cross sections showing still further embodiments of the present invention.

FIG. 7 and FIG. 8 illustrates a more specific embodiment of a centrifugal fan relating to that shown in connection with FIG. 5 and FIG. 6.

In FIG. 7, a centrifugal fan 51 for use in an automobile generally includes on its top, an inner and outer air changeover box 52, which selectively introduces air from inside and outside the passenger component by air open and closing operation and is constructed by a first scroll casing member 53, a fan 54 accommodated in the first scroll casing member 53 and a motor 55 for rotating the fan 54. Air from inside and outside the passenger compartment is selectively suctioned by the open and closing operation of the inner and outer air changeover box 52 and is introduced into the first scroll casing member 53 from a suction port 56 of the first scroll casing member 53; the air is blown out into a radial direction of the fan 54 and is finally discharged into a discharge port 57 of the first scroll casing member 53. This first scroll casing member 53 converts the dynamic pressure induced by the rotation of the fan 54 into static pressure. In the present embodiment, a noise suppressing arrangement is constructed by combining a porous member 61 and an air layer 60 formed between the porous member 61 and a resin made housing 58, which holds the main body of the motor 55, and the porous member 61 is sandwiched and secured between the first scroll casing member 53 and the resin made housing 58, resulting in a simplified structure, and the assembly is simplified and facilitated. Further, by constructing the porous member 61 with an elastic material containing active carbons or with a honeycomb shaped porous material containing a deodorant, a structure of a scroll casing is realized having a noise suppressing function and a deodorizing function.

In FIG. 7, the resin made housing 58, which holds the main body of the motor 55 is constructed with a second scroll casing member 59, which covers the bottom side of the first scroll casing member 53, and the air layer 60 is provided between the porous member 61 and the second scroll casing member 59. At the facing portion, a flat plate shaped from a member 62 between the first scroll casing member 53 and the second scroll casing member 59, holds the porous member 61 and is secured with a spring 63, which fastens the first scroll casing member 53 and the second scroll casing member 59. The construction of the second scroll casing member 59, which is formed integrally with the resin made housing 58 can be changed in order to avoid interference with other vehicle parts during mounting on the vehicle and to counteract the frequency components to be reduced. The construction of the second scroll casing member 59 does not necessarily match with the construction of the first scroll casing member 53. The porous member 61 held in the flat plate shaped frame member 62 is made of a material which includes air gaps in aggregates such as fibers, fine particles and air bubbles in formed bodies, wherein the air gaps and bubbles are connected to each other, an elastic material containing active carbons or a honeycomb shaped porous material containing deodorant.

The scroll casing incorporating the porous member 61 and the air layer 60 reduces noise over the entire frequency band; and further, the noise reduction amount is adjustable.

Now, an assembled structure of the second scroll casing member 59, which is formed integrally with the resin made housing 58 and porous member 61 is explained in detail.

FIG. 8 illustrates an assembled view of the second scroll casing member 59 including the resin made housing 58, which holds the motor main body 55, the motor main body 55 and the porous member 61. The motor main body 55 having a yoke body 65 of iron plates forming a circumference thereof is pushed into and secured in a cylindrical body 66 with a small projection 67 provided at the center of the resin made housing 58. The second scroll casing member 59, which surrounds the cylindrical body 66 includes a receiving portion 68 of the porous member 61 at the edge portion of the porous member 61 facing the porous member 61. The level surface of bottom wall face of the second scroll casing member 59 is substantially the same as that of the end portion of the cylindrical housing body 66 receiving the motor main body 55; the motor main body 55 is also surrounded by the air layer 60 and the side wall of the second scroll casing member 59. Therefore, the noise radiating from the motor main body 55 is also suppressed by a chamber formed by the second scroll casing member 59 around the cylindrical housing body 66. The porous member 61 is received on the receiving portion 68 and is pressed by a pressing portion 69 provided on the first scroll casing member 53 so that the porous member 61 is sandwiched and secured between the first scroll casing member 53 and the second scroll casing member 59 as explained above. When an elastic material such as urethane foam is used for the porous member 61, the elastic material is held by a frame body 62 having a limited grid portion around the circumference thereof; if necessary, the porous member 61 is further supported by a plurality of ribs 71 projecting up from the bottom inner wall of the second scroll casing member 59 together with the receiving portion 68. With such construction, the frame body 62, in which the porous member 61 is held, is simply and firmly secured between the first scroll casing member 53 and the second scroll casing member 59.

Figure 9:
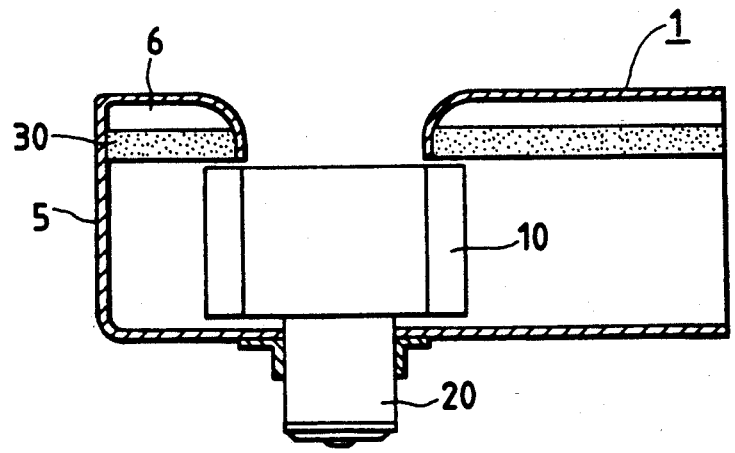
Figure 10:
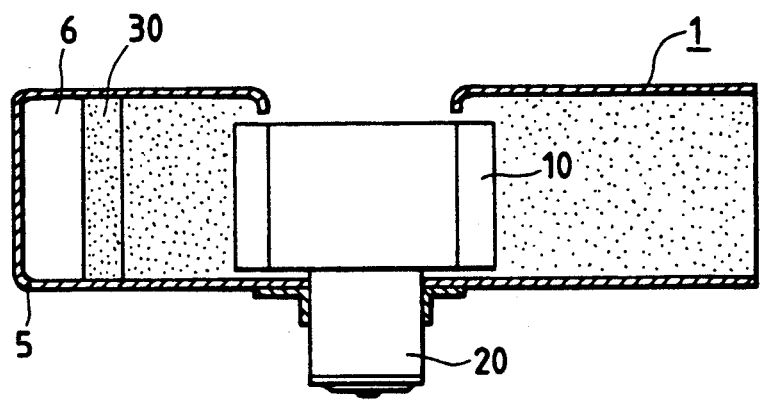

Further embodiments of the present invention are illustrated in FIG. 9 and FIG. 10. A partition plate 30 made of an elastic porous material is disposed at the suction side in FIG. 9 and is disposed around the scroll casing 5 in FIG. 10. In the respective embodiments, an air layer 6 is provided outside of the partition plate 30, and noise reduction is obtained.

In the above embodiments, examples of forward curved vanes, in particular, sirocco fan are explained, however the same effect with respect to noise reduction can be obtained with a centrifugal fan having backward curved vanes or radial curved vanes.

Further, for the elastic porous material, synthetic resin foamed bodies such as polyurethane series, vinyl chloride series, polyethylene series, polypropylene series, polyamide series, polystyrene series, rubber foamed bodies such as silicone rubber series, butyl rubber series, acrylic rubber series, NBR rubber series, SBR rubber series and natural rubber series, and glass wool are applicable.

Figure 11:
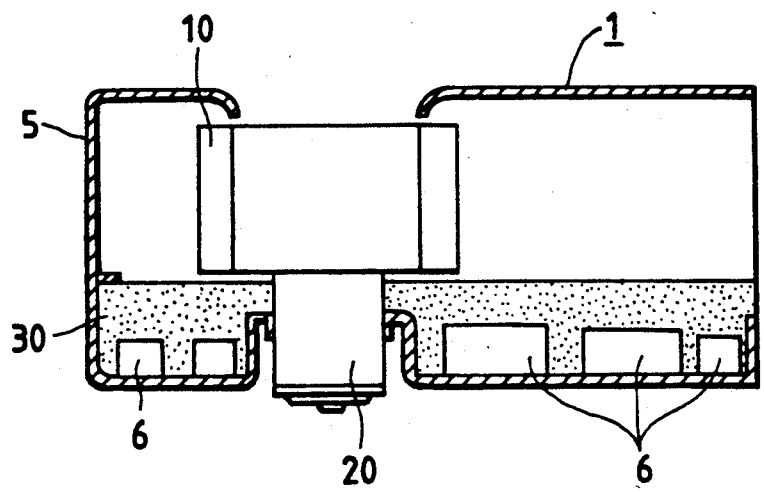

Further, an elastic porous material incorporating air layers in a plurality of locations as shown in FIG. 11 may be used for the elastic porous member. In such instance the elastic porous materials with nonuniform foaming and with air layers incorporated therein will reduce noise.

We claim:

1. A centrifugal fan comprising:
   a fan rotor,
   an electric motor for rotating said fan rotor,
   a scroll casing having an inner wall, for accommodating said fan rotor,
   a partition member made of a porous sound absorbing material and facing at least a portion of the inner wall of said scroll casing, and
   an air layer disposed behind said partition member and formed between said partition member and the inner wall of said scroll casing, whereby said partition member and said air layer suppress noise caused by rotation of said fan rotor and
   wherein said partition member faces a bottom inner wall of said scroll casing, and wherein said scroll casing includes a first scroll casing member covering said fan rotor and a second scroll casing member located in a bottom portion of said scroll casing, said second scroll casing member including a cylindrical housing located at a center of said second scroll casing member for holding said electric motor and said partition member being located and secured between said first scroll casing member and said second scroll casing member.

2. A centrifugal fan according to claim 1, wherein said centrifugal fan further comprises a grid shaped frame body holding said partition member.

3. A centrifugal fan according to claim 1, wherein a bottom level portion of the cylindrical housing provided in said second scroll casing member is substantially in the same plane as that of said second scroll casing member.

4. A centrifugal fan according to claim 1, wherein said porous sound absorbing material is an elastic material.

5. A centrifugal fan according to claim 1, wherein said porous sound absorbing material is selected form one of an elastic material includes active carbons and porous material containing deodorant.

* * * * *